(12) United States Patent
Zhu et al.

(10) Patent No.: US 12,140,854 B1
(45) Date of Patent: Nov. 12, 2024

(54) TWO-PIECE LCD PROJECTION DEVICE WITH LIGHT FILTER FUNCTION AND PROJECTION METHOD THEREOF

(71) Applicant: SHENZHEN KEJINMING ELECTRONIC CO., LTD., Shenzhen (CN)

(72) Inventors: Xianxiong Zhu, Shenzhen (CN); Yi Guan, Shenzhen (CN)

(73) Assignee: SHENZHEN KEJINMING ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/667,744

(22) Filed: May 17, 2024

(30) Foreign Application Priority Data

Jun. 12, 2023 (CN) .......................... 202310692183.7

(51) Int. Cl.
*G03B 21/20* (2006.01)
*G03B 21/00* (2006.01)

(52) U.S. Cl.
CPC ....... *G03B 21/2013* (2013.01); *G03B 21/006* (2013.01); *G03B 21/204* (2013.01); *G03B 21/2053* (2013.01); *G03B 21/2073* (2013.01); *G03B 21/208* (2013.01)

(58) Field of Classification Search
CPC G03B 21/2013; G03B 21/006; G03B 21/204; G03B 21/2053; G03B 21/2073; G03B 21/208
See application file for complete search history.

(56) References Cited

U.S. PATENT DOCUMENTS

2023/0324782 A1* 10/2023 Zhao ................. G03B 21/2033
353/122

FOREIGN PATENT DOCUMENTS

| CN | 207945512 U |   | 10/2018 |             |
|----|-------------|---|---------|-------------|
| CN | 114185233 A | * | 3/2022  | G03B 21/00  |
| CN | 114185235 A |   | 3/2022  |             |
| CN | 115145097 A |   | 10/2022 |             |
| CN | 115373199 A | * | 11/2022 | G03B 21/00  |
| CN | 217787588   |   | 11/2022 |             |
| CN | 218830146   |   | 4/2023  |             |
| CN | 218868294   |   | 4/2023  |             |

(Continued)

OTHER PUBLICATIONS

First Office Action issued in counterpart Chinese Patent Application No. 202310692183.7, dated Mar. 21, 2024.

*Primary Examiner* — Magda Cruz
(74) *Attorney, Agent, or Firm* — Westbridge IP LLC (57) ABSTRACT

Disclosed are a two-piece LCD projection device with light filter function and a method thereof. The method comprises: a yellow light passes through the condenser and then irradiates on the rear Fresnel lens to become a first light beam, and then passes through the first polarizer to become a first polarized light; a blue light is filtered by the blue light filter to form a target yellow light, which is condensed and then imaged on the screen by a dichroic mirror; a blue divergent light is converged by an aspheric lens, and then reflected by a mirror to the rear Fresnel lens, and becomes a second polarized light, then it enters a second set of LCD screens, and then it passes through a second front Fresnel lens and irradiates on the dichroic mirror, reflecting a light with blue wavelength, and imaging the reflected light on the screen for alignment.

2 Claims, 3 Drawing Sheets

(56) References Cited

FOREIGN PATENT DOCUMENTS

| | | | | | |
|---|---|---|---|---|---|
| CN | 218868294 | U | * | 4/2023 | ............... H04N 9/31 |
| CN | 116540486 | A | * | 8/2023 | ............. G03B 21/20 |

* cited by examiner

TWO-PIECE LCD PROJECTION DEVICE WITH LIGHT FILTER FUNCTION AND PROJECTION METHOD THEREOF

CROSS-REFERENCE TO RELATED APPLICATIONS

This application claims priority to Chinese Patent Application No. 202310692183.7, filed on Jun. 12, 2023, the content of which is incorporated herein by reference in its entirety.

TECHNICAL FIELD

The application relates to the technical field of projection, in particular to a two-piece LCD projection device with light filter function and a projection method thereof.

BACKGROUND

Liquid Crystal Display (LCD) works by placing liquid crystals between two pieces of parallel glass, and there are many small vertical and horizontal wires between the two pieces of glass. The rod-shaped crystal molecules are controlled to change direction by electrifying or not, and the light is refracted to produce an image. The existing projection technologies based on LCD include one-piece LCD projection, two-piece LCD projection (2LCD) and three-piece LCD projection (3LCD).

There are generally two kinds of 2LCD projection methods, one is to use a red and green color screen+a black and white screen; another one is to use two black and white screens. One of the input signals is red and green, and the other is blue. The red and green signals are alternately input, and the input frequency is consistent with the alternating frequency of the red and green illumination light. Through research, the inventor found that the temperature of LCD screen is too high in the red-green direction, which leads to the technical problem of low brightness.

SUMMARY

The present application aims to provide a two-piece LCD projection device with light filter function and a projection method thereof to solve the technical problem of low brightness caused by the high temperature of LCD screens.

In order to achieve the above purpose, the technical solutions adopted by the application are as follows.

A two-piece LCD projection device with light filter function is provided, including:

a first optical path imaging system and a second optical path imaging system;

the first optical path imaging system comprises a first set of projection light sources 1, a condenser 2, a rear Fresnel lens 3, a first polarizer 4.1, a blue light filter 5, a first set of LCD screens 6, a first front Fresnel lens 7.1, a dichroic mirror 13 and a projection lens 14;

the second optical path imaging system comprises a second set of projection light sources 8, an aspheric lens 9, a mirror 10, a rear Fresnel lens 11, a second front Fresnel lens 7.2, a second polarizer 4.2, a second set of LCD screens 12, the dichroic mirror 13 and the projection lens 14;

in the first optical path imaging system, a yellow light emitted by the first set of projection light sources 1 passes through the condenser 2 and is irradiated onto the rear Fresnel lens 3 to form a first light beam, the first light beam passes through the first polarizer 4.1 and becomes a first polarized light; a blue light in the first polarized light is filtered by the blue light filter 5 to form a target yellow light, the target yellow light is condensed by the first set of LCD screens 6 and the first front Fresnel lens 7.1 to form a red-green light, and the red-green light is imaged on a screen by the projection lens 14 after passing through the dichroic mirror 13;

in the second optical path imaging system, a blue divergent light emitted by the second set of projection light sources 8 is converged by the aspheric lens 9, and then reflected by the mirror 10 to the rear Fresnel lens 11 to become a second light beam; the second light beam is converted into a second polarized light by the second polarizer 4.2 and then incident on the second set of LCD screens 12, and then passes through the second front Fresnel lens 7.2 and then irradiates on the dichroic mirror 13; the dichroic mirror 13 reflects a light with blue wavelength irradiated through the second front Fresnel lens 7.2, images the reflected light on the screen through the projection lens 14, and the imaging result is aligned with the that of the first optical path imaging system.

Further, the first set of projection light sources 1 is a blue LED light source coated with yellow phosphor.

Further, the second set of projection light sources 1 is a blue LED light source.

Further, in the first optical path imaging system, the yellow light emitted by the first set of projection light sources 1 passes through the condenser 2 and is irradiated onto the rear Fresnel lens 3 to form a parallel first light beam.

Further, in the second optical path imaging system, the blue divergent light emitted by the second set of projection light sources 8 is converged by the aspheric lens 9, and then irradiated by the mirror 10 onto the rear Fresnel lens 11 to become the second light beam perpendicular to the first light beam.

Further, the first set of LCD screens 6 is a red-green LCD screen and the second set of LCD screens 12 is a black-and-white LCD screen; or, the first set of LCD screens 6 and the second set of LCD screens 12 are both black-white LCD screens.

Further, an included angle between the first set of LCD screens 6 and the second set of LCD screens 12 is 90°.

A projection method of a two-piece LCD projection device with light filter function is provided, which comprises the following steps:

controlling a first set of projection light sources 1 of a first optical path imaging system to emit a yellow light, and the yellow light passes through a condenser 2 and irradiates onto the rear Fresnel lens 3 to form a first light beam; the first light beam is converted into a first polarized light after passing through a first polarizer 4.1, the first polarized light filters a blue light of the first polarized light through a blue light filter 5 to form a target yellow light, and the target yellow light is condensed through a first set of LCD screens 6 and a first front Fresnel lens 7.1 to form a red-green light, and the red-green light passes through a dichroic mirror 13 and then is imaged on a screen through a projection lens 14;

controlling a second set of projection light sources 8 of a second light path imaging system to emit a blue divergent light, and the blue divergent light is converged by an aspheric lens 9 and then irradiated by a mirror 10 to a rear Fresnel lens 11 to become a second light beam; the second light beam is converted into a second polarized light through a second polarizer 4.2 and then enters a second set of LCD screens 12, and then passes through a second front Fresnel lens 7.2 and then irradiates onto the dichroic mirror 13; the dichroic mirror 13 reflects a light with blue wavelength irradiated through the second front Fresnel lens 7.2, and images the reflected light on the screen through the projection lens 14 to be aligned with the imaging of the first optical path imaging system;

monitoring display brightness of the aligned projection imaging result and temperature of the first set of LCD screens 6 in real time;

when the display brightness is lower than a preset brightness and the temperature of the first set of LCD screens 6 is lower than a first preset temperature, increasing luminous brightness of the first set of projection light sources 1 according to the temperature;

Further, after monitoring the display brightness of the aligned projection imaging and the temperature of the first set of LCD screens in real time, the method further comprises:

when the display brightness is higher than the preset brightness and the temperature of the first set of LCD screens 6 is lower than a second preset temperature, maintaining original luminous brightness of the first set of projection light sources 1.

The application further provides a two-piece LCD projection device with light filter function, and the two-piece LCD projection device further comprises a controller, and the controller is configured to realize the projection method.

In this solution, the first light beam becomes the first polarized light after passing through the first polarizer 4.1, and the blue light in the first polarized light is filtered by the blue light filter 5 to form the target yellow light, and then passes through the first set of LCD screens 6 after filtering out the invalid light. The irradiation of useless blue light on the first set of LCD screens 6 can be effectively reduced, and the excess heat generated by the reception of useless blue light by the first set of LCD screens 6 can be reduced or avoided, thereby reducing the temperature of the first set of LCD screens 6. In this way, the service life of the first set of LCD screens 6 can be prolonged, and for this reason, the light intensity borne by the first set of LCD screens 6 in the two-piece LCD projection device can be improved, and finally the projection brightness using the two-piece LCD projection device can be improved by improving the brightness of the projection light source in the two-piece LCD projection device with the filter function.

BRIEF DESCRIPTION OF THE DRAWINGS

In order to explain the technical solution of the embodiments of this application more clearly, the drawings described in the description of the embodiments of this application will be briefly introduced below. Obviously, the drawings in the present application and their accompanying detailed description are directed to merely exemplary embodiments of the application. For those of ordinary skill in this field, other drawings may be obtained according to these drawings without any creative effort.

Reference sign in the figures are as follows:

1—First set of projection light sources. 2—Condenser. 3—Rear Fresnel lens. 4.1—First polarizer. 4.2—Second polarizer. 5—Blue light filter. 6—First set of LCD screens. 7.1—First front Fresnel lens. 7.2—Second front Fresnel lens. 8—Second set of projection light sources. 9—Aspheric lens. 10—Mirror. 11—Rear Fresnel lens. 12—Second set of LCD screens. 13—Dichroic mirror. 14—Projection lens.

DETAILED DESCRIPTION OF THE EMBODIMENTS

In order to make the technical problems, technical solutions and beneficial effects of the present application more clear, the application will be further explained in detail below with reference to the drawings and embodiments. It should be understood that the specific embodiments described here are only used to illustrate the application, rather than to limit the application.

It should be noted that when an element is referred to as being "fixed" or "disposed" on another element, it may be directly on the other element or indirectly on the other element. When an element is referred to as being "connected" to another element, it may be directly connected to the other element or indirectly connected to the other element.

It should be understood that the orientations or positional relationships indicated by the terms "length", "width", "upper", "lower", "front", "rear", "left", "right", "vertical", "horizontal", "top", "bottom", "inner", "outer" and the like are based on the orientations or positional relationships shown in the attached drawings, only for convenience of describing the present invention and simplifying the description, and do not indicate or imply that the said device or element must have a specific orientation, be constructed or operated in a particular orientation, and therefore cannot be understood as a limitation of the present invention.

Furthermore, the terms "first" and "second" are used for descriptive purposes only and cannot be understood as indicating or implying relative importance or implicitly indicating the number of technical features indicated. Thus, a feature defined by "first" or "second" may explicitly or implicitly includes one or more of the features. For the description of the present invention, the meaning of "plurality" is two or more, unless otherwise specifically defined.

There are generally two kinds of 2LCD projection methods, one is to use a red and green color screen+a black and white screen; another one is to use two black and white screens. One of the input signals is red and green, and the other is blue. The red and green signals are alternately input, and the input frequency is consistent with the alternating frequency of the red and green illumination light. Through research, the inventor found that the temperature of the red-green LCD screen is too high in the red-green direction. Some blue light used in the red-green LCD screen is often not converted into red-green, and for the red-green LCD screen in the red-green direction, only the red-green spectrum will be transmitted, thus the blue light will be completely absorbed and converted into heat after reaching the red-green LCD screen. As a result, the temperature of the red-green LCD screen is too high, and the ability of the LCD screen to withstand light intensity is reduced, resulting in low brightness.

In view of this, the applicant provided a two-piece LCD projection device with light filter function, aiming at solving the above-described problem of low brightness caused by the decline of LCD screen's ability to withstand light intensity. Now, a 2LCD projection solution provided by the embodiments of this application will be described.

Embodiment 1—a Two-Piece LCD Projection Device with Light Filter Function

Figure 1:
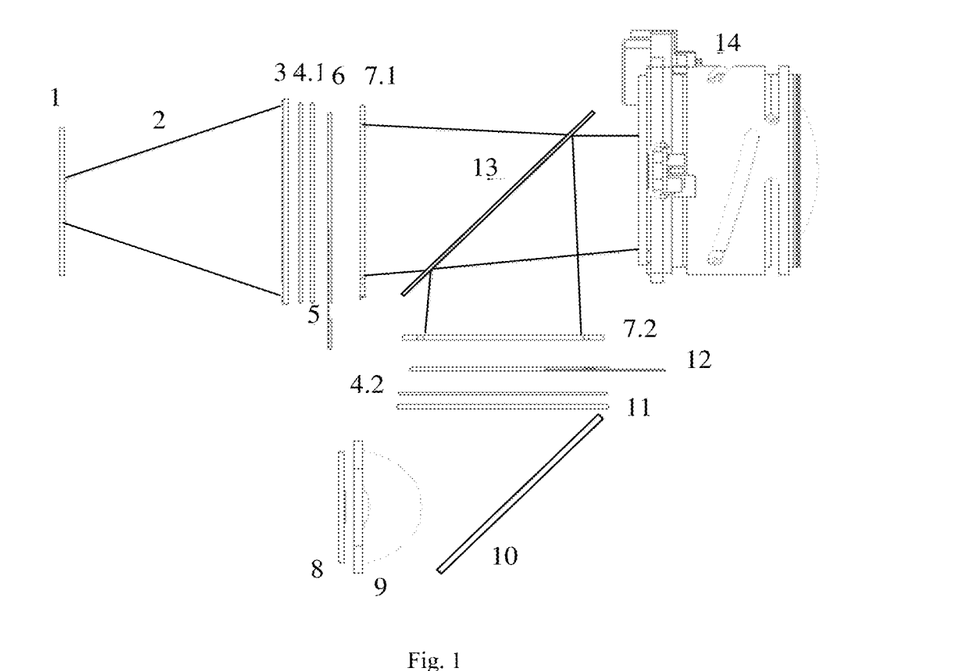
FIG. 1 is a structural schematic diagram of a two-piece LCD projection device with light filter function provided by an embodiment of the present application.

Referring to FIG. 1, an embodiment of the present application provides a two-piece LCD projection device with light filter function, including:
  a first optical path imaging system comprises a first set of projection light sources 1, a condenser 2, a rear Fresnel lens 3, a first polarizer 4.1, a blue light filter 5, a first set of LCD screens 6, a first front Fresnel lens 7.1, a dichroic mirror 13 and a projection lens 14; and
  a second optical path imaging system comprises a second set of projection light sources 8, an aspheric lens 9, a mirror 10, a rear Fresnel lens 11, a second front Fresnel lens 7.2, a second polarizer 4.2, a second set of LCD screens 12, the dichroic mirror 13 and the projection lens 14.

Specifically, in the first optical path imaging system and the second optical path imaging system, the position and arrangement of components are shown in FIG. 1. The first optical path imaging system and the second optical path imaging system are used as two imaging optical paths for imaging and alignment respectively. The following describes the optical path conduction imaging process of the two optical path systems.

In the first optical path imaging system, a yellow light emitted by the first set of projection light sources 1 passes through the condenser 2 and is irradiated onto the rear Fresnel lens 3 to form a first light beam, the first light beam passes through the first polarizer 4.1 and becomes a first polarized light; a blue light in the first polarized light is filtered by the blue light filter 5 to form a target yellow light, the target yellow light is condensed by the first set of LCD screens 6 and the first front Fresnel lens 7.1 to form a red-green light, and the red-green light is imaged on a screen by the projection lens 14 after passing through the dichroic mirror 13, so as to form one of the imaging optical paths and imaging results.

In the second optical path imaging system, a blue divergent light emitted by the second set of projection light sources 8 is converged by the aspheric lens 9, and then reflected by the mirror 10 to the rear Fresnel lens 11 to become a second light beam; the second light beam is converted into a second polarized light by the second polarizer 4.2 and then incident on the second set of LCD screens 12, and then passes through the second front Fresnel lens 7.2 and then irradiates on the dichroic mirror 13; the dichroic mirror 13 reflects a light with blue wavelength irradiated through the second front Fresnel lens 7.2, and images the reflected light on the screen through the projection lens 14, so as to form another imaging optical path and imaging result, which are aligned with the imaging of the first optical path imaging system. That is, after the two paths of imaging are aligned, they are projected onto the screen through the projection lens 14 to form the final projection result.

In this embodiment, the first light beam becomes the first polarized light after passing through the first polarizer 4.1, and the blue light in the first polarized light is filtered by the blue light filter 5 to form the target yellow light, and then passes through the first set of LCD screens 6 after filtering out the invalid light. In this way, the irradiation of useless blue light on the first set of LCD screens 6 can be effectively reduced, and the excess heat generated by the reception of useless blue light by the first set of LCD screens 6 can be reduced or avoided, thereby reducing the temperature of the first set of LCD screens 6. For this reason, the service life of the first set of LCD screens 6 can be prolonged, and meanwhile, the light intensity borne by the first set of LCD screens 6 in the two-piece LCD projection device with filter function can be improved. Finally, by improving the brightness of the projection light source in the two-piece LCD projection device with filter function, the projection brightness of the two-piece LCD projection device with filter function can be improved.

For example, in the first optical path imaging system, the first polarized light filters the blue light with the wavelength below 480 nm in the first polarized light through the blue light filter 5 to obtain the useful target yellow light with the wavelength above 480 nm.

In an embodiment, the first set of projection light sources 1 is a blue LED light source coated with yellow phosphor. In this embodiment, the implementation of the first set of projection light sources 1 is defined. It should be noted that, for the first optical path imaging system, the yellow light of the desired target is condensed by the first set of LCD screens 6 and the first front Fresnel lens 7.1 to form red-green light. Thus, the First Set of Projection Light Sources 1 may be a yellow LED light source, the direct yellow LED light source has low light conversion efficiency, poor temperature performance and high cost. In this embodiment, the way of applying yellow phosphor to the blue LED light source as the first set of projection light sources 1 can effectively improve the light conversion efficiency.

Figure 2:
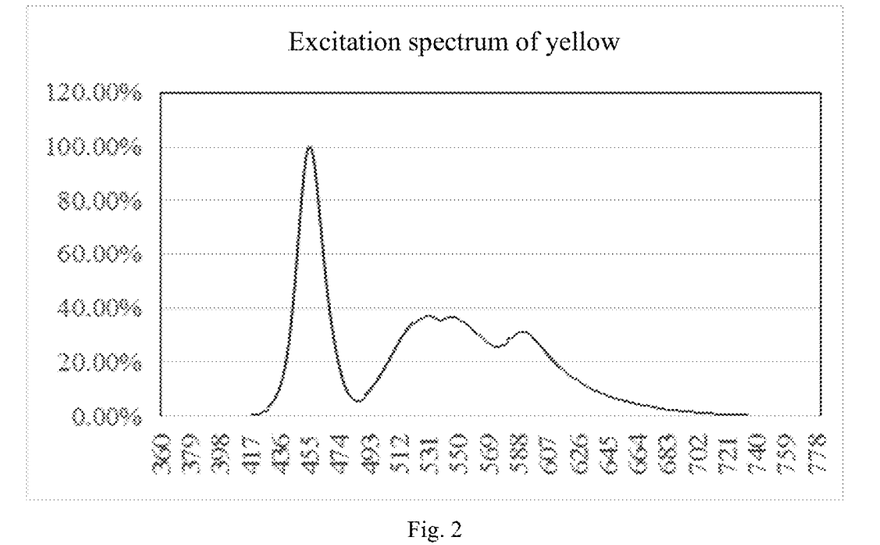
FIG. 2 is a schematic diagram of the spectrum of light emitted by a blue LED light source of the application.
Figure 3:
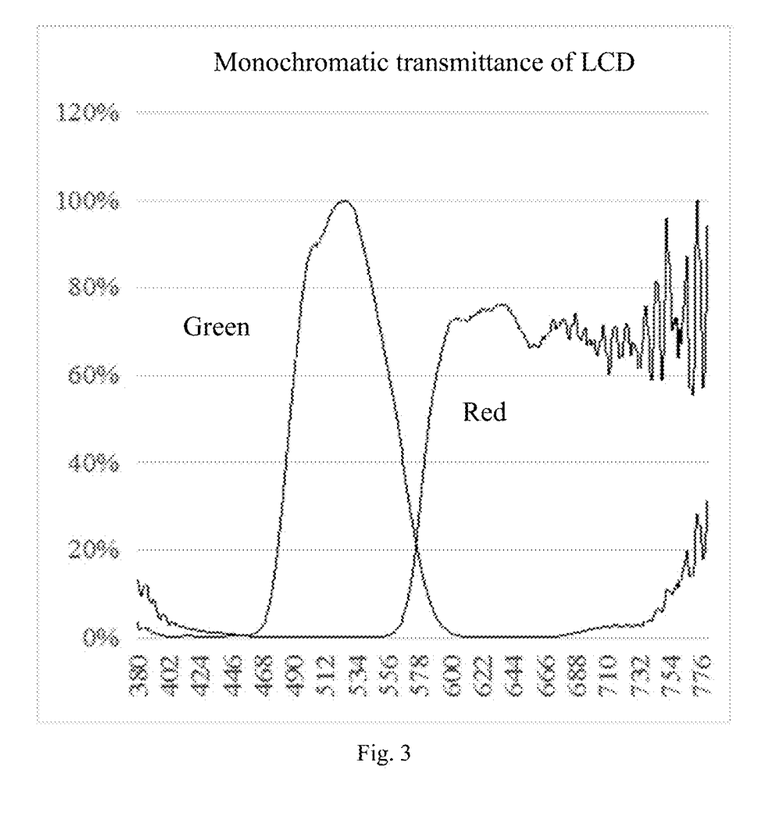
FIG. 3 is a schematic diagram of the transmittance of an LCD screen of this application.

As shown in FIGS. 2 and 3, FIG. 2 is a schematic diagram of the spectrum of light emitted by the blue LED light source, and FIG. 3 is a schematic diagram of the transmittance of the LCD screen. It can be seen that the transmitted light of the LCD screen is light waves above 480 nm, but the blue LED light source still has a large light energy output below 480 nm, and this light will generate a lot of heat when it is irradiated to the LCD screen, thus raising the temperature of the LCD screen and easily reducing the life of the LCD screen. After research and development, with the two-piece LCD projector with light filter function provided by the application, the temperature of the first set of LCD screens can be effectively reduced, and the life of the LCD can be prolonged. Meanwhile, the brightness of the projection light source can be further improved to improve the overall projection brightness.

Specifically, a relatively high conversion efficiency of red and green can be achieved by using a blue LED light source coated with fluorescent powder. However, as shown in FIG. 2, by analyzing the emission spectrum of the LED light source, it is concluded that due to the efficiency problem of fluorescence, more blue light will not be converted into red and green light, and the blue part will be fully absorbed and converted into heat after reaching the LCD. In this embodiment, the blue light filter 5 is arranged between the first polarizer 4.1 and the first set of LCD screens 6, so that the part that passes through the first polarizer 4.1 can be blocked by the blue light filter 5, thereby reducing the temperature on the rear first set of LCD screens 6, ensuring its service life and the ability to improve the rear brightness, and improving the overall projection brightness.

In an embodiment, the second set of projection light sources 1 is a blue LED light source. The second set of projection light sources 1 may also be other light sources that emit blue light, and the details are not specifically defined.

In an embodiment, in the first optical path imaging system, the yellow light emitted by the first set of projection light sources 1 passes through the condenser 2 and is irradiated onto the rear Fresnel lens 3 as a parallel first light beam. It should be noted that the first light beam formed by irradiating the rear Fresnel lens 3 may also be a near-parallel light, and it is not specifically defined. In this embodiment, the parallel light or nearly parallel light beam is injected into the first polarizer 4.1, which reduces light refraction and effectively utilizes incident light.

In an embodiment, in the second optical path imaging system, the blue divergent light emitted by the second set of projection light sources 8 is condensed through the aspheric lens 9, and then irradiated to the rear Fresnel lens 11 through the mirror 10 to become a second beam perpendicular to the first beam. Then it is reflected by the mirror 10 to the rear Fresnel lens 11 and vertically injected into the second polarizer 4.2, which can also reduce the refraction of light and effectively use the incident light.

In an embodiment, the first set of LCD screens 6 is a color LCD screen, and the second set of LCD screens 12 is a black-white LCD screen. Alternatively, both the first set of LCD screens 6 and the second set of LCD screens 12 are black-white LCD screens. In this embodiment, the two-piece LCD projection device with light filter function may be realized by two LCD modes. One is a red-green screen+a black-white screen, and the other is two black-white screens. The input signal of one LCD screen is red and green, and the input signal of the other LCD screen is blue. The red and green signals are alternately input, and the input frequency is consistent with the alternating frequency of the red and green illumination light. In this embodiment, the specific implementation mode is expanded to improve the adaptability to the scene. Moreover, it is worth noting that whether it is the mode of two black-white LCD screens or red-green+ black-white LCD screen, the temperature of the LCD screen in the red-green direction can be effectively reduced with the adoption of the filter setting mode provided by the embodiment of the application, so that the service life of the LCD screen is prolonged and the projection brightness is improved. It is also worth noting that when the red-green LCD screen is used, only the red-green spectrum passes through the red-green LCD screen, and the blue part will be completely absorbed and converted into heat after reaching the LCD. Therefore, in this case, the red-green LCD screen is effectively prevented from being too hot and the projection brightness is ensured through the embodiment of the application.

In an embodiment, the included angle between the first set of LCD screens 6 and the second set of LCD screens 12 is 90°. Setting the first set of LCD screens 6 and the second set of LCD screens 12 to 90° is convenient for setting the dichroic mirror 13. For example, the dichroic mirror 13 is set between the first front Fresnel lens 7.1 and second front Fresnel lens 7.2. And the included angle between the dichroic mirror 13 and first front Fresnel lens 7.1/second front Fresnel lens 7.2 is 45°. In this way, the two-piece LCD projector with light filter function can be made compact in structure. It is ensured that dichroic mirror 13 can completely transmit the red and green light condensed by first front Fresnel lens 7.1, and the blue wavelength light irradiated through the second front Fresnel lens 7.2 can be completely reflected, thus ensuring the imaging quality of the two-optical path system.

Figure 4:
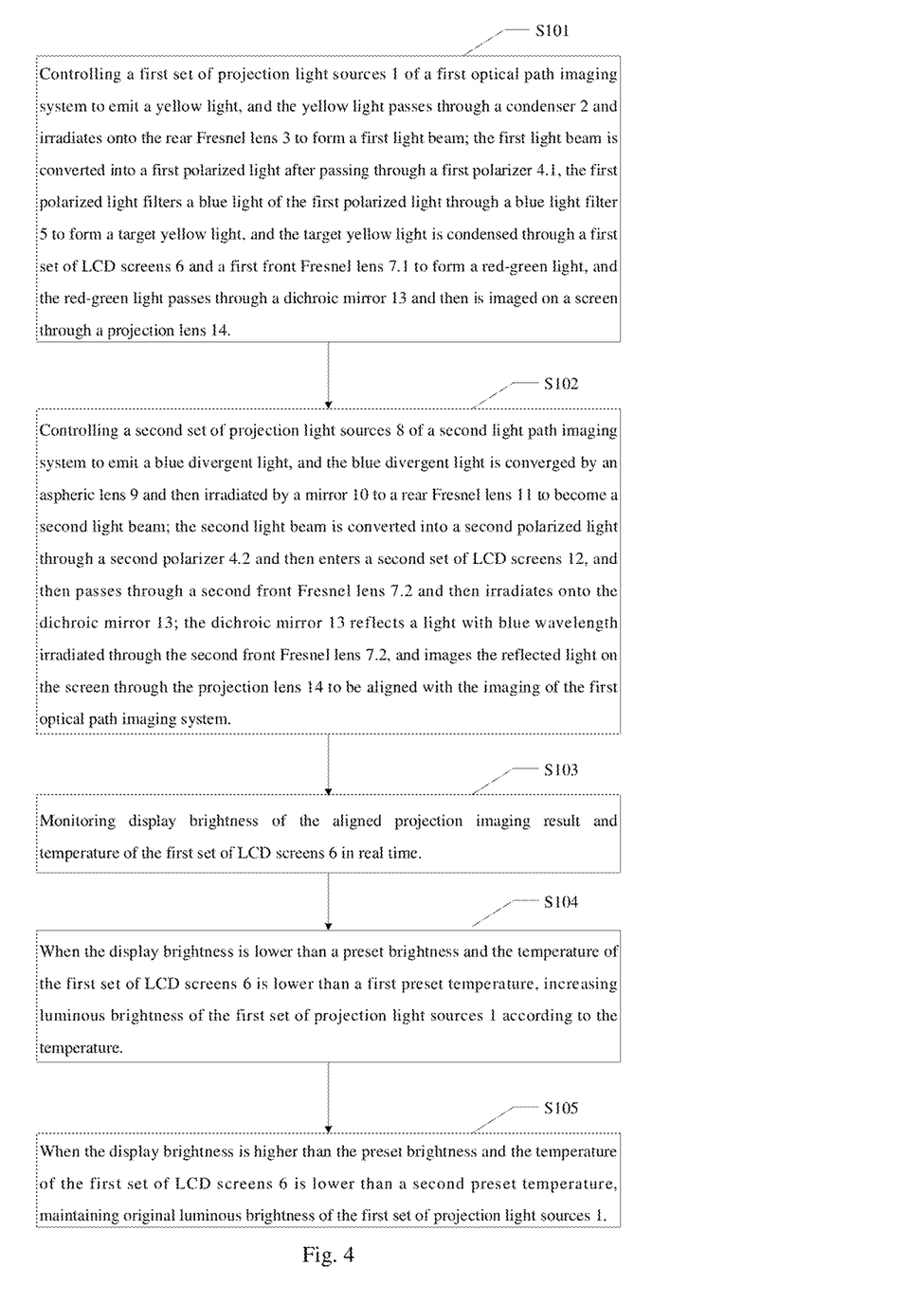
FIG. 4 is a flow chart of a projection method of a two-piece LCD projection device with light filter function of this application.

Embodiment 2—A Projection Method of a Two-Piece LCD Projection Device with Light Filter Function In an embodiment, a projection method of a two-piece LCD projection device with light filter function is provided, which is based on the two-piece LCD projection device with light filter function described in the previous embodiment, the method comprises:

S101: controlling a first set of projection light sources 1 of a first optical path imaging system to emit a yellow light, and the yellow light passes through a condenser 2 and irradiates onto the rear Fresnel lens 3 to form a first light beam; the first light beam is converted into a first polarized light after passing through a first polarizer 4.1, the first polarized light filters a blue light of the first polarized light through a blue light filter 5 to form a target yellow light, and the target yellow light is condensed through a first set of LCD screens 6 and a first front Fresnel lens 7.1 to form a red-green light, and the red-green light passes through a dichroic mirror 13 and then is imaged on a screen through a projection lens 14.

S102: controlling a second set of projection light sources 8 of a second light path imaging system to emit a blue divergent light, and the blue divergent light is converged by an aspheric lens 9 and then irradiated by a mirror 10 to a rear Fresnel lens 11 to become a second light beam; the second light beam is converted into a second polarized light through a second polarizer 4.2 and then enters a second set of LCD screens 12, and then passes through a second front Fresnel lens 7.2 and then irradiates onto the dichroic mirror 13; the dichroic mirror 13 reflects a light with blue wavelength irradiated through the second front Fresnel lens 7.2, and images the reflected light on the screen through the projection lens 14 to be aligned with the imaging of the first optical path imaging system.

In steps S101-S102, when projection is needed, the light source in the two-piece LCD projection device with light filter function is controlled first. That is, the first set of projection light sources 1 of the first optical path imaging system is controlled to emit yellow light, and the second set of projection light sources 8 of the second optical path imaging system is controlled to emit blue divergent light. After these two types of light are emitted, imaging through the first optical path imaging system and second optical path imaging system is aligned to the screen to realize projection. The process, principle and technical effect of optical path imaging conduction can be referred to the description of the above-mentioned device embodiment, and will not be repeated here.

S103: monitoring display brightness of the aligned projection imaging result and temperature of the first set of LCD screens 6 in real time.

S104: when the display brightness is lower than a preset brightness and the temperature of the first set of LCD screens 6 is lower than a first preset temperature, increasing luminous brightness of the first set of projection light sources 1 according to the temperature.

In this embodiment, the projection process is optimally controlled in combination with the two-piece LCD projection device with light filter function provided by the embodiment of the application. In this embodiment, the display brightness of the aligned projection imaging result and the temperature of the first set of LCD screens can be detected in real time through a light sensor and temperature sensor, and the parameters detected by the sensor are fed back to the projection controller. After the projection controller obtains the display brightness and temperature, it will make a comprehensive judgment. Specifically, the embodiment of the application is provided with two temperature thresholds, namely, a first preset temperature and a second preset temperature, which are related to the projection system, can be determined by experiments, and can also be obtained by experiments. The projection controller will determine the relationship between the display brightness and the preset brightness, and the relationship between the temperature of the first set of LCD screens and the first and second preset temperatures. When the display brightness is lower than the preset brightness and the temperature of the first set of LCD screens is lower than the first preset temperature, the luminous brightness of the first set of projection light sources 1 would be increased according to the temperature.

In this embodiment, firstly, the light intensity acceptance ability of the first set of LCD screens is improved by using the special light path conduction setting of the two-piece LCD projection device with light filter function. On this basis, the luminous brightness of the first set of projection light sources 1 with adjustable luminous brightness is set. When the display brightness is lower than the preset brightness and the temperature of the first set of LCD screens is lower than the first preset temperature, it indicates that the display brightness at this time is not enough, while the light intensity receptivity of the first set of LCD screens is improved by projection through the optical path system, and the first set of LCD screens will remain relatively low. Therefore, when the temperature of the first set of LCD screens is lower than the first preset temperature, the luminous brightness of the first set of projection light sources 1 can be improved according to the temperature.

For example, the first set of projection light sources 1 is a blue LED light source, and the first set of LCD screens is a color LCD screen. The luminous brightness of the blue LED light source is adjustable, and the blue LED light source is connected to the projection controller. When the temperature of the color LCD screen is lower than the first preset temperature and the display brightness is lower than the preset brightness, the luminous brightness of the blue LED light source is improved according to the detected temperature of the color LCD screen, and the brightness is improved by increasing the power of the blue LED light source. The way of improving the luminous brightness can be changed according to the temperature step, and the luminous brightness of the blue LED light source is changed corresponding to the step, the details are not specifically defined.

It is worth noting that in this embodiment, when monitoring the temperature of the first set of LCD screens, the display brightness is monitored at the same time. By combining the two, the filtering effect of the set optical path system can be monitored and the projection imaging quality can be ensured, while the brightness and temperature are ensured to be appropriate.

In an embodiment, after monitoring the display brightness of the aligned projection imaging and the temperature of the second set of LCD screens in real time, the method further comprises:

S105: when the display brightness is higher than the preset brightness and the temperature of the first set of LCD screens 6 is lower than a second preset temperature, maintaining original luminous brightness of the first set of projection light sources 1.

In this embodiment, when the display brightness is higher than the preset brightness and the first set of LCD screens is lower than the second preset temperature, it indicates that the original luminous brightness of the first set of projection light sources 1 is sufficient at this time. Moreover, the projection system can keep the temperature value of the first set of LCD screens lower than the set value, thus reducing the loss of the first set of LCD screens and maintaining the original luminous brightness of the first set of projection light sources 1. In this case, the brightness of the first set of projection light sources 1 can be adjusted at any time as needed.

It should be noted that in one embodiment, the second preset temperature is lower than the first preset temperature.

Embodiment 3—a Two-Piece LCD Projection Device with Light Filter Function

In an embodiment, the two-piece LCD projection device with light filter function includes a projection controller for realizing the projection method of the two-piece LCD projection device with light filter function described in Embodiment 2, in addition to the two-piece LCD projection device with light filter function described in Embodiment 1.

In this embodiment, with the two-piece LCD projection device with light filter function provided by the embodiment of the present application, the first light beam becomes the first polarized light after passing through the first polarizer 4.1, and the blue light in the first polarized light is filtered by the blue light filter 5 to form the target yellow light, and then passes through the first set of LCD screens 6 after filtering out the invalid light. In this way, the irradiation of useless blue light on the first set of LCD screens 6 can be effectively reduced, and the excess heat generated by the reception of useless blue light by the first set of LCD screens 6 can be reduced or avoided, thereby reducing the temperature of the first set of LCD screens 6. For this reason, the service life of the first set of LCD screens 6 can be prolonged, and meanwhile, the light intensity borne by the first set of LCD screens 6 in the two-piece LCD projection device with filter function can be improved. Finally, by improving the brightness of the projection light source in the two-piece LCD projection device with filter function, the projection brightness of the two-piece LCD projection device with filter function can be improved. That is, the brightness adjustment solution of the two-piece LCD projection device with filter function is improved, which can better meet the needs of users for high brightness projection and is more practical.

In addition, on the basis of this system, the two-piece LCD projection device with light filter function also optimizes the control of projection display brightness through the control logic of the application, thus ensuring the practicability of the solution.

In an embodiment, the method further comprises:
controlling a signal input device to synchronously input red, green and blue signals into the first set of LCD screens 6 and the second set of LCD screens 12, wherein, the first set of LCD screens 6 and the second set of LCD screens 12 are used to display a color image through signal differentiation display, the first set of LCD screens 12 is used to display a red-green image, and the second set of LCD screens 12 is used to display a blue image.

In this embodiment, different from the conventional solutions, the first set of LCD screens and the second set of LCD screens of the present solution are directly used to display color images through signal differentiation display. The first set of LCD screens is used to display red and green images, and the second set of LCD screens is used to display blue images, without inputting the color signals to their respective LCD screens after processing. In this way, the signal processing time (or signal processing devices such as drivers) can be reduced, the display efficiency can be obviously improved and the cost can be saved.

The above are merely the preferred embodiments of this application, and are not intended to limit the application. Any modification, equivalent substitution and improvement made within the spirit and principle of this application shall be included in the protection scope of this application.

What is claimed is:

1. A projection method of a two-piece Liquid Crystal Display (LCD) projection device with light filter function, wherein the two-piece LCD projection device comprises: a first optical path imaging system and a second optical path imaging system; the first optical path imaging system comprises a first set of projection light sources, a condenser, a rear Fresnel lens, a first polarizer, a blue light filter, a first set of LCD screens, a first front Fresnel lens, a dichroic mirror and a projection lens; the second optical path imaging system comprises a second set of projection light sources, an aspheric lens, a mirror, a rear Fresnel lens, a second front Fresnel lens, a second polarizer, a second set of LCD screens, the dichroic mirror and the projection lens; wherein the projection method comprises:

controlling a first set of projection light sources of a first optical path imaging system to emit a yellow light, wherein the yellow light passes through a condenser and irradiates onto the rear Fresnel lens to form a first light beam; the first light beam is converted into a first polarized light after passing through a first polarizer, the first polarized light filters a blue light of the first polarized light through a blue light filter to form a target yellow light, and the target yellow light is condensed through a first set of LCD screens and a first front Fresnel lens to form a red-green light, and the red-green light passes through a dichroic mirror and then is imaged on a screen through a projection lens;

controlling a second set of projection light sources of a second light path imaging system to emit a blue divergent light, wherein the blue divergent light is converged by an aspheric lens and then irradiated by a mirror to a rear Fresnel lens to become a second light beam; the second light beam is converted into a second polarized light through a second polarizer and then enters a second set of LCD screens, and then passes through a second front Fresnel lens and then irradiates onto the dichroic mirror; the dichroic mirror reflects a light with blue wavelength irradiated through the second front Fresnel lens, and images the reflected light on the screen through the projection lens to be aligned with the imaging of the first optical path imaging system;

monitoring a display brightness of the aligned projection imaging result and a temperature of the first set of LCD screens in real time;

when the display brightness is lower than a preset brightness and the temperature of the first set of LCD screens is lower than a first preset temperature, increasing luminous brightness of the first set of projection light sources according to the temperature; and when the display brightness is higher than the preset brightness and the temperature of the first set of LCD screens is lower than a second preset temperature, maintaining original luminous brightness of the first set of projection light sources.

2. The projection method of claim 1, wherein the method further comprises:

controlling a signal input device to synchronously input red, green and blue signals into the first set of LCD screens and the second set of LCD screens, wherein, the first set of LCD screens and the second set of LCD screens are used to display a color image through signal differentiation display, the first set of LCD screens is used to display a red-green image, and the second set of LCD screens is used to display a blue image.

* * * * *